Oct. 27, 1942.  J. G. CURADO ET AL  2,300,107
APPARATUS AND METHOD OF TESTING SURFACES
Filed Aug. 4, 1941  2 Sheets-Sheet 1

INVENTORS
Joseph G. Curado
Richard A. Denton
BY
Marechal rdae
ATTORNEYs

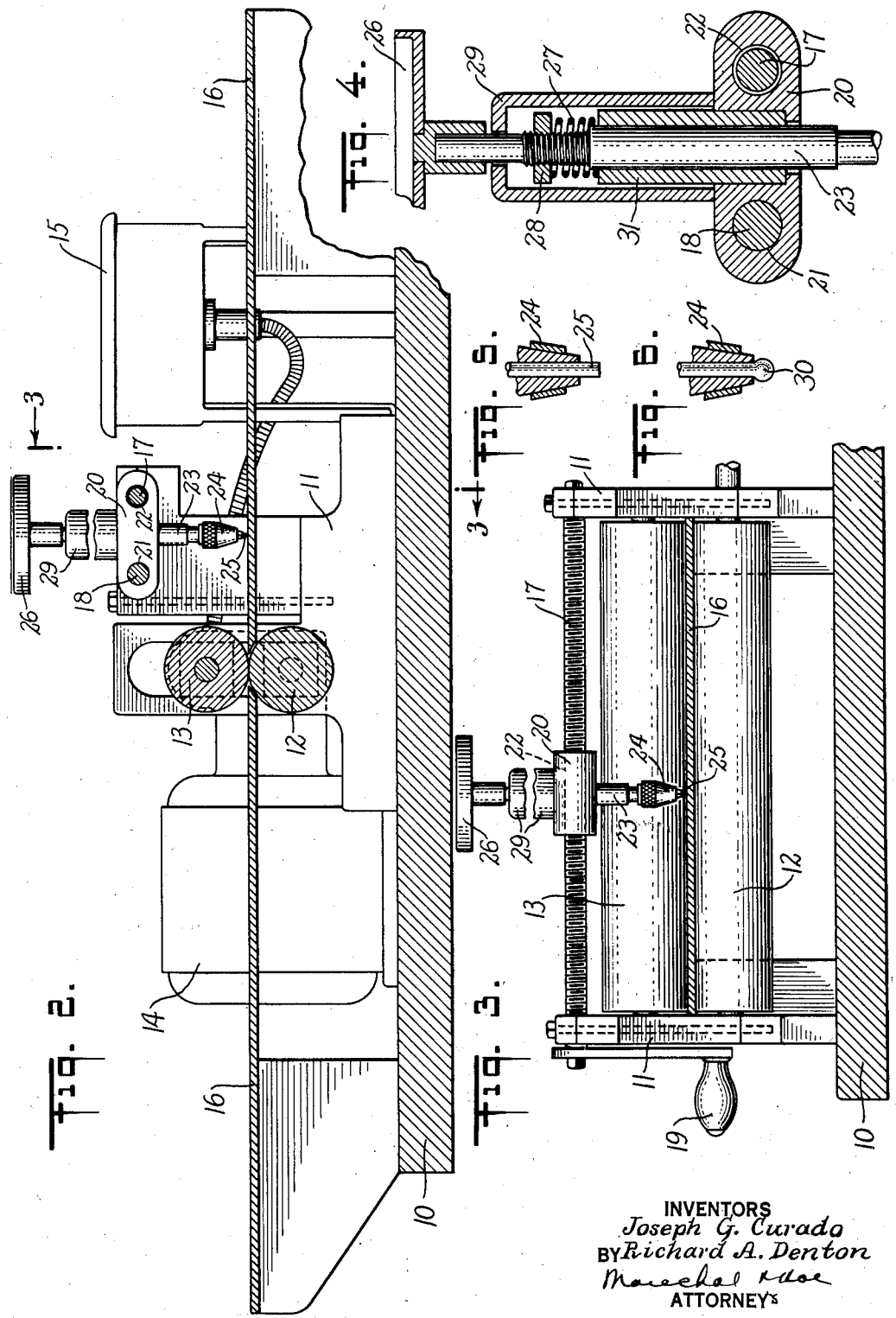

Patented Oct. 27, 1942

2,300,107

UNITED STATES PATENT OFFICE 2,300,107

APPARATUS AND METHOD OF TESTING SURFACES

Joseph G. Curado, Rutherford, and Richard A. Denton, Mountain View, N. J., assignors to General Printing Ink Corporation, New York, N. Y., a corporation of Delaware Application August 4, 1941, Serial No. 405,276

12 Claims. (Cl. 73—51)

This invention relates to an apparatus and method for testing the resistance to smearing and marring of surfaces, and more particularly of printed surfaces.

In the art of producing printed matter, many mechanical operations are carried out subsequent to the actual printing operation, such as feeding the sheets, cutting, folding, conveying and the like, in which the printed surface is subjected to a rubbing or scratching action of the automatic machinery, frequently resulting in unsightly marring of the printed subject where such mechanical contact has taken place.

Furthermore, subsequent handling of the printed material often causes additional marring by rubbing or scratching of the characters and pictures when the ink used is of such character as to be affected by this type of treatment.

Consequently, the so-called "scratch" resistance or mar resistance of a printed ink is an important characteristic, particularly from the point of view of advertising material and the like where the value of the cut depends on its ability to retain its original undefaced appearance.

In the past, printers have evaluated this so-called scratch resistance by passing the backs of the fingernails rapidly across the printed sheet, and observing the mark left on the printed matter. Results obtained in this way obviously varied with the individual and with different tests of the same individual; but no satisfactory substitute test or apparatus for getting more satisfactory or more comparable results were in use.

There were so-called scratch testers used in other industries but as these utilized a sharp point to produce a distinct cutting of the object under test, such as paint, metal or other surface, they were unsatisfactory for use on printed paper because such a sharp scratching or cutting instrument in its normal operation destroyed the paper. Furthermore they did not simulate the action either of the mechanical abrasions of the automatic feeding, etc., equipment of the printing press, nor of the fingernail test of the practical printer.

A primary object of our invention is to provide a method and apparatus for determining the resistance of printed matter to marring resulting from such rubbing, scratching, etc., and by which comparable results which are precise and reproducible may be obtained, and which are not dependent on the personal method of testing of the individual making the test.

A further object is to provide a method and apparatus for making comparable tests, readily understandable by those in the printing industry, by reproducing the type or kind of marring or scratching heretofore produced by the fingernails, by means which can be accurately measured and compared.

A still further object is to provide a means for testing the scratch resistance of surfaces by subjecting the printed surface under test to the action of a blunt tipped, non-heat-conductor applied under variable predetermined conditions of speed and pressure.

These objects are carried out by the apparatus and method illustrated and described in the accompanying specification and drawings, in which:

Fig. 2 is a side elevation partly in section, taken along line 2—2 of Fig. 1.

Fig. 3 is a transverse elevation taken along line 3—3 of Fig. 2.

Fig. 4 is a vertical section of the tip holding and pressure applying mechanism taken along line 4—4 of Fig. 1.

Figs. 5 and 6 are details of two alternative tip mechanisms adapted to be used with our invention.

Like characters denote similar parts throughout the several figures.

Figure 1:
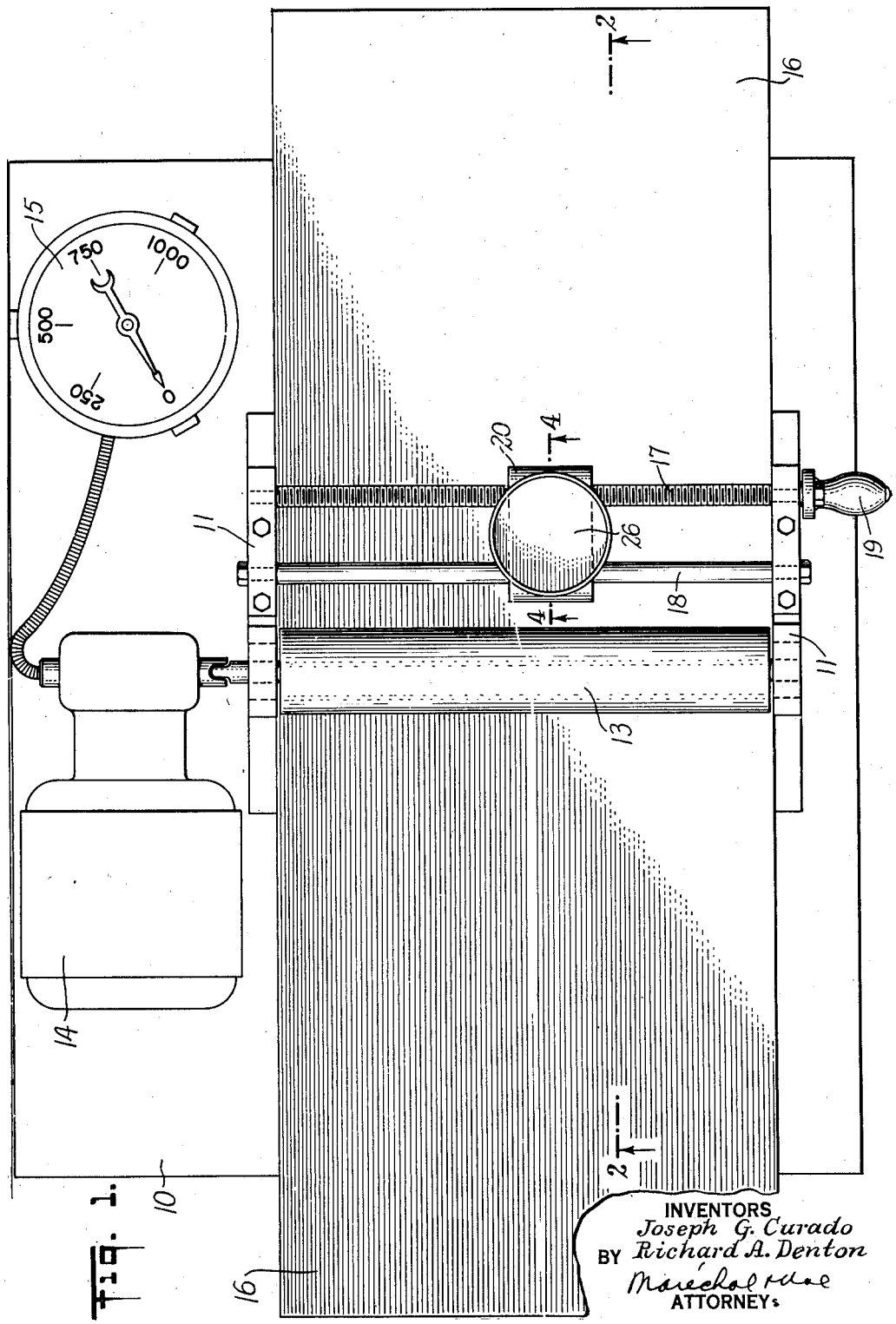
Fig. 1 is a plan view.

Referring to the drawings, base 10 carries two parallel side frames 11, 11, upon which are mounted vertically aligned paper feeding rolls 12 and 13. At least one of these rolls should be of rubber or other resilient material, the other can be metal or the like. The lower roller 12 is driven by variable speed motor 14, controlled by a suitable speed control means illustrated diagrammatically at 14', and the speed is recorded on tachometer 15. Mounted on base 10 and positioned between side frames 11, 11 is a feed table 16 extending horizontally on either side of the feed rolls 12, 13, the top of the table being tangential to both rolls.

The testing mechanism proper is slidably mounted upon two cylindrical carriage bars 17 and 18, both bars in turn being mounted in parallel relation upon and between side frames 11, 11, in horizontal relation in front of feed rolls 12, 13. One of the carriage bars 17 is threaded and is provided with a handle 19 whose function will be described hereinafter. Bar 18 is smooth and serves as a guide for the tester which can be moved laterally between side frames 11, 11 by turning handle 19. The testing mechanism is supported on the carriage bars 17, 18 by carriage block 20 provided with two cylindrical holes 21, 22 through which pass the guide bar 18 and feed bar 17. The testing mechanism is made up of rod 23, machined and "lapped" into extremely close fitting contact with sleeve 31, which in turn is closely fitted into a recessed hole in carriage block 20, thus avoiding objectionable play or relative lateral movement of the rod and sleeve to insure smooth movement of the testing mechanism along the surface under test. Rod 23 is provided at its lower extremity with a pin vise 24 which holds the testing pin 25. A weight pan 26 rests on the upper end of rod 23. Spring 27 encircles the upper portion of rod 23 and rests on sleeve 31. Rod 23 can be adjusted by nut 28 to a spring tension sufficient to support the entire weight of the testing mechanism and weight pan so that pin 25 just touches the feeding table 16 without pressing thereon. A thimble 29 covers the upper portion of rod 23 and the spring assembly, and rests on carriage block 20. The test pin, as shown at 25, preferably has an end which is spherical or arcuate in cross-section, as illustrated at 30. But it may be of other desired form (flat as shown in Fig. 5), which avoids a point sharp enough to actually tear or cut the surface under test.

In operation, the printed sheet to be tested is placed on the feed table 16 beneath the test pin 25. The motor is then started and brought to the desired speed. The test mechanism is moved to the desired lateral position by turning handle 19 which moves the carriage block along the carrier feed and guide bars. If several determinations are to be made using different weights and/or different speeds, it is convenient to start with the carriage well to the left or right, and to move it by successive increments for each successive test on the same sheet. When the test sheet and testing pin are in position, the desired weight is placed on the weight pan 26 which transfers the required pressure to the pin 25 and thence to the test surface. The sheet is moved by hand, from the right as shown in Fig. 1, into the nip of the revolving rolls 12, 13, until they grip the sheet and carry it beneath the test pin at the desired uniform speed. If the weight and speed used on the first test have been insufficient to leave a mark or scratch on the print, the carrier is moved laterally and another test is run adjacent the first, on the same sheet, varying either speed or pressure or both, until an easily perceptible line is produced across the printed surface or it is demonstrated that no such perceptible line is produced. In this way, also, comparisons can be made of the effect of different speeds and pressures.

In general weaker papers such as news, catalog and other groundwood or tissue stocks, and the like, can best be evaluated at relatively slow speeds, varying the weights applied, to obtain the necessary comparisons. This avoids tearing of the stocks which occurs when a weak paper is suddenly acted upon by a too rapidly moving test member. For stronger stocks, higher speeds can be used and the weights also increased. An increase in speed for a given weight increases the severity of the test, as does also the addition of greater weights.

Thus by varying either speeds or weights, or both, testing conditions can be ascertained suitable for different grades of paper or other surfaces as well as for the inks thereon, and conditions determined at which accurate comparisons can be made of the same inks printed on different stocks, and of different inks printed on the same stocks.

The marks, i. e. so-called scratches, produced by the action of our tester are of the same type and appearance as those produced by the rubbing and scraping action of the various machinery parts as described above, and also comparable to the marks left by the printer's fingernail test. And by testing at varying speeds and weights these marks or mars can be made comparable to those produced with an ink, printed in a press, upon a certain paper; and thereafter by controlling to use speed and weight determined to be properly coordinated or comparable to the press speed, comparable results may be attained before another ink is used on that press for a similar job of printing. Thus speeds and weights may be found which will accurately reproduce the results actually attained during commercial press operations, and with the apparatus as described these speeds may be varied to equal or be properly comparable to actual printing press speeds. Or quantitative tests may be worked out based on an ink whereby the comparable "scratch proofness" or mar resistance of other inks may be determined with great accuracy. While some of such marks are not perhaps scratches in a strict sense of the word, printers customarily refer to the "scratch-proofness" of printing inks and printed sheets. When examined under a magnifying glass the mark appears to result from a melting and distortion or drawing out of the ink characters or surfaces, and this is particularly noticeable in the half tone areas where the individual half tone dots can be seen to be drawn out and smeared by the test implement. This observation seems to explain the fact that metals or other heat conducting materials when used as testing members do not produce the characteristic mark desired, and usually give practically no marking action unless such heavy pressures are used as will tear or destroy the sheet. It seems probable, therefore, that the heat generated by the friction of a non-heat conductor type of rod, such as one having a Pyrex glass bead, or Bakelite, or the like, fails to disperse the heat through its own mass, and hence this heat is concentrated at the point of its generation and is sufficiently transferred to the ink film as the tip passes over the surface momentarily to affect the ink film by melting or softening it and distorts it to cause the phenomenon and leave the "scratch" type of mark described; whereas, when a metal tip is used, the relatively small amount of frictional heat generated in the brief period of the test is conducted away so rapidly as to prevent raising the temperature at the ink film sufficiently thus to melt, soften or distort the film.

While this theory may not be so, it is a fact that a tip such as described which is a non-heat conductor, does produce the characteristic comparable scratch mark, and materials such as glass, synthetic plastics (such as Bakelite) and the like have been found to be satisfactory in use. Not all non-heat conducting materials produce the same degree of distortion or marking of the ink film which permits of selection of more or less drastic acting tips depending on the hardness of the film to be tested. Certain plastic tips, for example, produce a relatively light mark, and can therefore be used in testing soft, easily marred inks to obtain the threshold value of speed and pressure at which the printed matter is affected. Harder films, on the other hand, that are scarcely marked by plastic materials, can be tested with a glass tip which has a considerably more drastic effect than does the plastic.

While the method herein described and the form of apparatus for carrying this method into effect constitute preferred embodiments of the invention, it is to be understood that the invention is not limited to the precise method and apparatus and that changes may be made in either without departing from the scope of the invention as described and defined in the appended claims.

What is claimed is:

1. Apparatus for determining the resistance to scratching or marring of printed surfaces comprising a blunt testing member of low heat conductivity, means for varying the pressure exerted by said member, means for feeding the printed surface under test beneath said non-heat-conducting member, and means for controlling the speed of travel of said surface beneath said non-heat-conducting member, said feeding means and its control being constructed for imparting to the printed surface being tested speeds comparable to those attained in printing presses.

2. Apparatus for determining the resistance to scratching or marring of printed surfaces comprising a blunt testing member for frictional contact with the printed surface to be tested, means for localizing the friction generated heat at said surface, means for varying the pressure exerted by said member, means for feeding the printed surface under test beneath said non-heat-conducting member, and means for controlling the speed of travel of said surface beneath said non-heat-conducting member, said feeding means and its control being constructed for imparting to the printed surface being tested speeds comparable to those attained in printing presses.

3. Apparatus for determining the resistance to scratching or marring of printed surfaces comprising a blunt testing member for frictional contact with the printed surface to be tested, said member being resistant to heat transfer for localizing the friction generated heat at said surface, means for varying the pressure exerted by said member, means for feeding the printed surface under test beneath said non-heat-conducting member, and means for controlling the speed of travel of said surface beneath said non-heat-conducting member, said feeding means and its control being constructed for imparting to the printed surface being tested speeds comparable to those attained in printing presses.

4. Apparatus for determining the resistance to scratching or marring of printed surfaces comprising a non-heat conducting blunt testing member, means for varying the pressure exerted by said member on the printed surface, means for feeding the surface under test beneath said non-heat-conducting member, means for controlling the speed of travel of said surface beneath said non-heat-conducting member, and means for laterally adjusting the testing member with respect to the direction of travel of the surface under test.

5. Apparatus for determining the resistance to scratching or marring of printed surfaces comprising a non-heat-conducting testing member, means for varying the pressure exerted by said member, means for feeding the surface under test beneath said non-heat-conducting member, means for controlling the speed of travel of said surface beneath said non-heat-conducting member, said feeding means and its control being constructed for imparting to the printed surface being tested speeds comparable to those attained in printing presses, means for laterally adjusting the testing member with respect to the direction of travel of the surface under test, and means for absorbing the weight of the test mechanism to prevent weight other than the predetermined added weight from being applied to the tip.

6. Apparatus for determining the resistance to scratching or marring of printed surfaces comprising a pair of co-acting feed rollers, a feeding table horizontally aligned with the nip of said rollers, a member carrying a blunt tip for frictional contact with the printed surface vertically positioned with respect to said table, means for localizing at said surface the friction generated heat, weight supporting means above and effective to urge said tip against said surface for imparting a predetermined pressure thereto, means for driving said co-acting feed rollers, said feeding means and its control being constructed for imparting to the printed surface being tested speeds comparable to those attained in printing presses, and means for recording the speed of the rollers.

7. Apparatus for determining the resistance to scratching or marring of printed surfaces comprising a horizontal feeding table for the article bearing said printed surface, a pair of vertically aligned contacting feed rolls having their nip in alignment with the top of said table for receiving said printed article and propelling it therebetween and along said table, means for positively driving said rolls at a uniform predetermined selected speed; a testing member positioned vertically above said feeding table, and laterally adjustable along the width of said table, said member comprising a blunt, non-heat conducting tip for frictional contact with the printed surface and having means for localizing at said surface the friction gnerated heat, means for controlling vertical setting of said member with relation to said feed table, and a weight-carrying member positioned above and in pressing contact with said member, for imparting a predetermined pressure of said member upon the printed surface.

8. Method for testing the scratching or marring resistance of printed surfaces which comprises subjecting said surface to the action of a blunt non-heat-conducting testing member at a predetermined speed coordinated with respect to the speed attained in a printing press and under predetermined pressure.

9. Method for testing the marring resistance of printed surfaces which comprises placing the surface in contact with a blunt testing member, subjecting said member to predetermined pressure, and drawing said surface beneath said testing member at a predetermined uniform speed coordinated with respect to the speed attained in a printing press while maintaining said predetermined pressure, and localizing the friction generated heat during passage of the printed surface past the marring member.

10. Method for testing the resistance to scratching or marring of printed surfaces when subjected to rubbing or scratching in a printing press which comprises imprinting the surface to be tested, passing the imprinted surface over a non-tearing member having a blunt and heat-localizing testing portion, maintaining said testing member against the printed surface under predetermined pressure and controlling the speed of travel of the printed surface past the testing member to a predetermined speed selected as comparably coordinated with respect to the speed in a printing press.

11. Method for determining the relative resistance to scratching or marring of surfaces printed with different inks, which comprises imprinting the surface with a known ink, passing the printed surface over a non-tearing member having a blunt and heat-localizing testing portion, maintaining said testing member against the printed surface under predetermined pressure and controlled speed of travel of the printed surface past the testing member, to establish a standard of comparison, and subsequently subjecting surfaces imprinted with other inks to the same conditions of rubbing and marring for visual comparison.

12. Method for testing the relative resistance to scratching or marring of a surface printed with an ink, to determine its relative resistance to rubbing or scratching in a printing press, which comprises imprinting the surface to be tested, passing the printed surface over a non-tearing member having a blunt and heat-localizing testing portion in a plurality of paths through comparable portions of the printed surface, and varying the pressure of the testing member against the printed surface and the speed of travel with respect to the printed surface during each pass, to provide comparative results.

JOSEPH G. CURADO.
RICHARD A. DENTON.